United States Patent
Sterz et al.

(10) Patent No.: US 12,550,232 B2
(45) Date of Patent: Feb. 10, 2026

(54) DOMESTIC MICROWAVE APPLIANCE HAVING A DOME-SHAPED MICROWAVE SHIELD

(71) Applicant: BSH Hausgeräte GmbH, Munich (DE)

(72) Inventors: Sebastian Sterz, Großaitingen (DE); Markus Kuchler, Gstadt am Chiemsee (DE); Kerstin Rigorth, Mühldorf (DE); Matthias Vogt, Obersulm (DE)

(73) Assignee: BSH Hausgeräte GmbH, Munich (DE)

( * ) Notice: Subject to any disclaimer, the term of this patent is extended or adjusted under 35 U.S.C. 154(b) by 1045 days.

(21) Appl. No.: 17/632,513

(22) PCT Filed: Aug. 25, 2020

(86) PCT No.: PCT/EP2020/073691
§ 371 (c)(1),
(2) Date: Feb. 3, 2022

(87) PCT Pub. No.: WO2021/043622
PCT Pub. Date: Mar. 11, 2021

(65) Prior Publication Data
US 2022/0279632 A1    Sep. 1, 2022

(30) Foreign Application Priority Data
Sep. 5, 2019    (DE) .................... 10 2019 213 485.8

(51) Int. Cl.
*H05B 6/64* (2006.01)
*G01J 5/00* (2022.01)
(Continued)

(52) U.S. Cl.
CPC .......... *H05B 6/6455* (2013.01); *G01J 5/0804* (2022.01); *G01J 5/0859* (2013.01); *H05B 6/6402* (2013.01); *G01J 2005/0077* (2013.01)

(58) Field of Classification Search
CPC .. H05B 6/6411; H05B 6/6447; H05B 6/6402; H05B 6/6423; H05B 6/6458; H05B 6/68;
(Continued)

(56) References Cited

U.S. PATENT DOCUMENTS 4,286,134 A * 8/1981 Nakata ................... H05B 6/745
219/757
4,347,418 A 8/1982 Nobue
(Continued)

FOREIGN PATENT DOCUMENTS

EP    1126748 A2    8/2001
EP    3477205 A1    5/2019
(Continued)

OTHER PUBLICATIONS

Kako, JP 2006242420 (Year: 2006).*
(Continued)

*Primary Examiner* — Vy T Nguyen
(74) *Attorney, Agent, or Firm* — Michael E. Tschupp; Andre Pallapies; Brandon G. Braun

(57) ABSTRACT

A household microwave appliance includes a cooking compartment, a cooking compartment wall surrounding the cooking compartment and including a cooking compartment opening, and a microwave dome arranged remote from the cooking compartment and designed to cover the cooking compartment opening. The microwave dome includes a first sensor opening and a second sensor opening, with a first sensor arranged behind the first sensor opening and oriented directly into the cooking compartment, and with a second sensor arranged behind the second sensor opening and oriented indirectly into the cooking compartment via a reflecting surface of the microwave dome.

10 Claims, 3 Drawing Sheets

(51) Int. Cl.
*G01J 5/08* (2022.01)
*G01J 5/0804* (2022.01)

(58) Field of Classification Search
CPC . H05B 6/745; F24C 15/00; F24C 7/06; F24C 7/087
USPC ....... 219/711, 494, 754, 757, 510, 685, 703, 219/707, 709, 710, 749, 751; 99/325; 426/231, 241, 523; 374/149, 121, 124, 374/134, 161 E, 1.001
See application file for complete search history.

(56) References Cited

U.S. PATENT DOCUMENTS

| | | |
|---|---|---|
| 4,367,388 A | 1/1983 | Ishihara |
| 4,376,131 A | 3/1983 | Mori |
| 5,237,141 A | 8/1993 | Yoshino |
| 5,360,965 A | 11/1994 | Ishii |
| 5,589,094 A | 12/1996 | Bu |
| 5,744,786 A | 4/1998 | Kim |
| 5,986,249 A | 11/1999 | Yoshino |
| 6,007,242 A | 12/1999 | Uehashi |
| 2003/0047559 A1 | 3/2003 | Watanabe |
| 2010/0128755 A1 | 5/2010 | Luckhardt |
| 2013/0248522 A1 | 9/2013 | Hwang |

FOREIGN PATENT DOCUMENTS

| | | |
|---|---|---|
| JP | S5949427 A | 3/1984 |
| JP | 2006242420 A | 9/2006 |

OTHER PUBLICATIONS

Miyazaki, JP S5949427 A (Year: 1984).*
National Search Report DE 10 2019 213 485.8 dated Jul. 15, 2020.
International Search Report PCT/EP2020/073691 dated Nov. 5, 2020.

* cited by examiner

DOMESTIC MICROWAVE APPLIANCE HAVING A DOME-SHAPED MICROWAVE SHIELD

CROSS-REFERENCES TO RELATED APPLICATIONS

This application is the U.S. National Stage of International Application No. PCT/EP2020/073691, filed Aug. 25, 2020, which designated the United States and has been published as International Publication No. WO 2021/043622 A1 and which claims the priority of German Patent Application, Serial No. 10 2019 213 485.8, filed Sep. 5, 2019, pursuant to 35 U.S.C. 119 (a)-(d).

The contents of International Application No. PCT/EP2020/073691 and German Patent Application, Serial No. 10 2019 213 485.8 are incorporated herein by reference in their entireties as if fully set forth herein.

BACKGROUND OF THE INVENTION

The invention relates to a household microwave appliance having a cooking compartment and a cooking compartment wall that surrounds the cooking compartment and said cooking compartment wall has a cooking compartment opening that is covered by a microwave dome that is arranged remote from the cooking compartment.

EP 2 642 822 B1 discloses a cooking apparatus. This cooking apparatus comprises a housing, a muffle that is arranged in the interior of the housing and surrounds a cooking compartment, a detection hole that is incorporated on a wall of a side of the muffle with the result that an infrared beam that is generated in the cooking compartment can be emitted to the outer side of the cooking compartment, and an infrared beam detecting apparatus having a reflecting mirror that has a plurality of reflective surfaces and that is configured so as to change a path of an incident infrared beam, and having an infrared beam sensor that is configured so as to receive the deflected infrared beam in order to detect an intensity of the infrared beam whereby the size of the detection hole is reduced.

U.S. Pat. No. 4,286,134 A discloses an oven that is fitted with an infrared detector element that is capable of detecting in a contactless manner the temperature of food that is to be heated, wherein a reflector converges the infrared beams onto the detector element. The reflector is attached in a pivotable manner in order to cover a plate that has an inlet opening in order to receive bundled beams from the reflector.

EP 0 856 703 A1 discloses a cooking apparatus that comprises an infrared beam sensor that is arranged so that it detects infrared radiation from food from above at an incline. The infrared beam sensor includes a circuit board, a light receiving section, a photo interrupter and a chopper.

BRIEF SUMMARY OF THE INVENTION

The object of the present invention is to at least in part overcome the disadvantages of the prior art and in particular to provide an improved possibility for receiving measurement data from a cooking compartment of a household microwave appliance in an advantageous manner from a thermal perspective and in terms of microwave technology.

This object is achieved in accordance with the features of the independent claims. Advantageous embodiments are the subject matter of the dependent claims, the description and the drawings.

The object is achieved by a household microwave appliance having a cooking compartment and a cooking compartment wall that surrounds the cooking compartment with an opening ("cooking compartment opening") that is covered by a microwave dome that is arranged in particular remote from the cooking compartment, wherein the microwave dome has at least one first opening ("first sensor opening"), behind which a first sensor is arranged in a stationary manner, and a second opening ("second sensor opening"), behind which a second sensor is arranged in a stationary manner, the first sensor is oriented directly into the cooking compartment and the second sensor is oriented indirectly into the cooking compartment via a reflecting surface of the microwave dome.

This household microwave appliance provides the advantage that only one cooking compartment opening is provided for multiple sensors. Since cooking compartment openings usually must be thermally insulated in a complex manner and closed in a manner sealed with respect to microwaves, a possibility for receiving measurement data is therefore provided in which in comparison to providing one cooking compartment opening per sensor, a smaller flow of heat escapes from the cooking compartment and a smaller loss of microwaves occurs. Owing to the indirect orientation of the second sensor, the possibility is provided of designing the microwave dome in a particularly compact manner. In this manner advantageously a particularly great freedom in the positioning of the second sensor is also provided. Since the reflecting surface only deflects the measured radiation but does not deflect vapor, moreover the probability of a contamination of the second sensor by vapor is reduced. Owing to the stationary arrangement of the sensors, moreover a particularly robust, compact and reliable arrangement is rendered possible. Owing to the deflection of the measured radiation, the second sensor can furthermore be mounted further from the opening and/or in a cooler region and/or can be more easily cooled by a cooling air flow.

The household microwave appliance can be a stand-alone microwave appliance or a microwave combination appliance such as a microwave appliance having at least one additional IR radiant heater (for example an electric resistance heating element). In particular, the household microwave appliance can be an oven having an additional microwave functionality. The household microwave appliance can have one or more typical components of such an appliance such as at least one microwave generator (magnetron, semiconductor-based microwave generator), an inverter, at least one microwave guiding arrangement that is arranged between the microwave generator and the cooking compartment, at least one rotary antenna, at least one wobbler or stirrer, a turntable, etc. in an essentially known manner. The cooking compartment wall has a typically front-side loading hatch that can be closed by means of a door that is sealed with respect to microwaves. The cooking compartment wall can also be referred to as a muffle.

The cooking compartment opening can be integrated in a side wall of the cooking compartment wall, for example in a left-hand side wall, a right-hand side wall, a cover, a rear wall and/or a base of the cooking compartment wall. The cooking compartment opening can however also be located in an edge or transition between side regions and/or in a corner of the cooking compartment wall. The cooking compartment opening corresponds in particular to a flat surface that is spanned by the edge of the cooking compartment opening. The cooking compartment opening can also be referred to as a wall opening.

The microwave dome is located on the side of the cooking compartment opening that is remote from the cooking compartment and said microwave dome covers the cooking compartment opening. In particular, the microwave dome sits in a manner sealed with respect to microwaves on an edge region of the cooking compartment opening that is remote from the cooking compartment. Microwave domes are used so as to shield against microwave radiation that escapes from the cooking compartment through the cooking compartment opening and said microwave domes are typically made from electrically conductive material at least on their inner side that faces the cooking compartment. Microwave domes are formed as so-called "cut-off hollow conductors", wherein typically the power density of the microwave radiation that prevails in the microwave dome decreases with increasing distance from the cooking compartment opening. The sensor openings are advantageously located in a region of the microwave dome with noticeably reduced or even practically negligible microwave density. The microwave dome is in particular formed in a shell-like manner. An edge of the open side lies in particular on the outer side on the cooking compartment wall, for example by means of a flange. The shape of the microwave dome is essentially arbitrary and for example can have a basic shape that is hemisphere-shaped, cone-shaped, truncated cone-shaped, pyramid-shaped, truncated pyramid-shaped, rectangular etc. The base area can therefore be round or rectangular. It is particularly advantageous for the effective maintenance of the cut-off characteristic if an opening angle of the dome is in a range between 40° and 80° and a height of the microwave dome is in the range of 30 mm to 70 mm.

The microwave dome that has the at least two sensor openings is in particular a stand-alone microwave dome. For this purpose, apart from the sensor openings in one development the microwave dome does not have any further openings that are exposed to the cooking compartment but rather it only has possible side fastening openings etc. Specifically, an antenna, in particular rotary antenna, is not accommodated in the stand-alone microwave dome. In one development, the rotary antenna is accommodated in a further microwave dome, the so-called "antenna dome".

The microwave dome in its simplest form has a first sensor opening and a second sensor opening however it can also have further (third, fourth etc.) sensor openings and respective further sensors are located behind said further sensor openings. The fact that sensors are located "behind" a sensor opening means in particular that the sensors are arranged or are accommodated on a side of the microwave dome that is remote from the cooking compartment.

The fact that the first sensor is oriented "directly" in the cooking compartment includes in particular that measurement radiation that enters into the microwave dome from the cooking compartment through the cooking compartment opening reaches the first sensor without deflection (in other words directly) through the first sensor opening.

The fact that the second sensor is oriented via a reflecting surface of the microwave dome "indirectly" into the cooking compartment includes in particular that measurement radiation that enters into the microwave dome from the cooking compartment through the cooking compartment opening only reaches the second sensor after deflection (in other words indirectly) through the second sensor opening. The reflecting surface can correspond to the base shape of the inner side of the microwave dome or can deviate from said base shape in order to achieve a desired image distortion and/or to achieve a desired image section.

In one embodiment, the first sensor is an optical camera or a camera that is sensitive in the spectral range that is visible to humans, the reflecting surface is a surface that reflects infrared radiation and the second sensor is an infrared camera (IR). The advantage is therefore achieved that both images in the visible spectral range as well as IR images can be recorded from the cooking compartment through a cooking compartment opening. Owing to the identical sensor opening, a particularly high degree of conformity of the fields of view or fields of vision of the optical camera and IR camera is rendered possible. In lieu of an IR camera, in general other IR sensors can be used, for example a thermopile or a group of thermopiles etc.

However, the opposite arrangement is also possible in which the first sensor is an IR camera, the reflecting surface is a surface that reflects visible light, and the second sensor is an optical camera. If the invention is described below with reference to the above embodiment having the optical camera as the first sensor and the IR camera as the second sensor, the opposite arrangement is thereby also included in a similar manner.

In general however, sensors other than a camera can also be provided as the first sensor, for example at least one chemical sensor, oxygen sensor, humidity sensor, lidar, ultrasonic sensor, etc.

In one embodiment, the reflecting surface of the microwave dome is configured (in other words arranged and formed) so that the fields of view or fields of vision of the optical camera and the IR camera in the cooking compartment at least to a large extent conform. In particular, one of the fields of view can lie entirely in the other field of view. As a consequence, the advantage is achieved that a high degree of conformity of the fields of view or fields of vision is particularly reliably achieved by the optical camera and IR camera.

In one embodiment, the reflecting surface is attached to a wall of the microwave dome, in particular fixedly or in a stationary manner. The advantage is therefore achieved that the reflecting surface can be realized in a particularly cost-effective and compact manner. In this case, it is possible to utilize the most electrically conductive construction materials that the microwave dome has on its inner side for the microwave shielding and that also have a good IR reflection capability. The disadvantage of the use of electrically conductive materials—namely the increased thermal dissipation on account of said electrically conductive materials—is compensated by the advantage of the optical and/or IR reflection capability of said electrically conductive materials. The electrically conductive inner side of the microwave dome is in other words simultaneously used as an optical and/or infrared reflecting surface. Suitable electrically conductive construction materials include for example metals such as copper, silver, aluminum etc. In one development, the inner side of the microwave dome is metal coated.

In one embodiment, the reflecting surface is provided on a mirror element that is attached to the microwave dome in a pivotable manner and the mirror element has at least two positions, in particular end positions, of which in a first position, in particular end position, the optical camera is oriented directly in the cooking compartment and the IR camera is oriented indirectly in the cooking compartment via the reflecting surface of the mirror element ("operating position") and in a second position, in particular end position, the mirror element covers the optical camera and/or the IR camera with respect to the cooking compartment ("idle position"). The advantage is therefore achieved that the mirror element is used in the second position as a thermal cover and consequently the thermal load or temperature that is incident on the sensors is clearly reduced. In one development, the household microwave appliance is configured so as to only then bring the mirror element into the first position if at least one of the cameras is to record an image (for example every 5 s, 10 s, 30 s, 1 min etc.), and is to afterward bring the mirror element back into the second position. Vapor that ascends from the cooking compartment in the second position only reaches in particular the rear side of the mirror element that is not used for the reflection with the result that then outside of the measurement phases, the front side reflection surface is protected against contamination. A further advantage resides in the fact that the optical camera and the IR camera can simultaneously record images from the cooking compartment.

In one embodiment, the reflecting surface is provided on a mirror element that is attached in a pivotable manner to the microwave dome and the mirror element has two positions, in particular end positions, of which in a first position, in particular end position, the mirror element covers the IR camera with respect to the space of the microwave dome while the optical camera is oriented directly in the cooking compartment ("idle position") and in a second position, in particular end position, the IR camera is oriented indirectly in the cooking compartment via the reflecting surface of the mirror element while the optical camera is covered by the mirror element ("operating position"). In the second position, the mirror element therefore enables the view of the IR camera into the cooking compartment. In one development, the household microwave appliance is configured so as to only then bring the mirror element into the second position if the IR camera is to record an IR image (for example every 5 s, 10 s, 30 s, 1 min etc.), and is to afterward bring the mirror element back into the first position. Vapor that ascends from the cooking compartment in the first position only reaches the rear side of the mirror element with the result that then outside the image recording phases of the IR camera, the front side IR reflection surface is protected against contamination.

In one development, the cooking compartment opening, the first sensor opening and/or the second sensor opening can be covered by means of at least one associated cover element. At least one cover element can be attached in a stationary manner to the associated opening. At least one cover element can be movably attached (for example in a pivotable, rotatable, displaceable manner, etc.) to the associated opening for the selective covering or revealing of the opening.

In one embodiment, the first sensor opening is permanently covered by means of a cover element of optically transparent material. The optically transparent material can be for example glass, the cover element can be for example a glass disc. The cover element can be impermeable to infrared radiation, which advantageously reduces a thermal load of the optical camera.

In one development, the second sensor opening is permanently covered by means of a cover element of material that is impermeable to infrared radiation. The cover element can be optically transparent, which renders possible a greater diversity of materials for the cover element.

In one embodiment, the second sensor opening can be selectively covered and revealed by means of a movable cover element of material that is impermeable to infrared radiation. As a consequence, the advantage is achieved that the IR camera is thermally particularly effectively protected. Moreover, such an embodiment is particularly cost-effective since materials that are permeable to infrared radiation are comparatively expensive and/or sensitive.

In one development, the first sensor opening can be selectively covered and revealed by means of a movable cover element of a material that is impermeable to infrared radiation. As a consequence, the advantage is achieved that the optical camera can be particularly effectively protected from a thermal perspective. In one development, this cover element is also optically opaque, whereby it is possible to select materials having a particularly high thermal contact resistance.

In one embodiment, the cooking compartment opening can be selectively covered and revealed with respect to the microwave dome by means of a movable cover element. As a consequence, the advantage is achieved that in the case of a cover element that is positioned so as to cover, it is possible to protect the entire interior of the microwave dome, in particular including all the sensor openings, with respect to thermal radiation and vapor. The cover element can be optically transparent or opaque.

In one development, the cover element is arranged in its position, which reveals the cooking compartment opening, between the cooking compartment wall and the microwave dome or is accommodated in a pocket or protrusion that is provided in the edge of the microwave dome in order to keep the region of the cover element for each of its positions sealed with respect to microwaves.

In one development, the cover element is arranged on the microwave dome in a plane between its edge or the cooking compartment wall and the sensor opening that is placed closest to the cooking compartment opening, in particular the second sensor opening. It is consequently possible for a heat insulating layer to already be integrated on the outside between the cooking compartment wall and the cover element. This has the advantage that a greater heat resistance is provided between the cooking compartment and the sensors, which advantageously affects the thermal decoupling of the sensors from the cooking compartment. In one development, the cover element is incorporated in a pocket or protrusion of the microwave dome in order also to keep the microwave dome sealed with respect to microwaves in the region of the cover element for each of its positions.

In one embodiment, the cover element that covers the cooking compartment opening is optically transparent and impermeable to infrared radiation. As a consequence, the advantage is achieved that the optical camera can also still record images from the cooking compartment in the event of the cover element being brought in front of the cooking compartment opening.

In general, thermally stable rigid brittle materials are used for microwave domes. When such materials are also used as the material of a cover, these materials can then be problematic if they break or become detached from a holding arrangement and, in particular in the event of a cover-side arrangement of the microwave dome, if they fall undetected into the food. A further advantage of the embodiment having an optical camera and/or an IR camera as sensor(s) is that it is then possible by means of the camera(s) to identify whether a cover no longer changes its operating position or is missing entirely: either it is then not possible to capture an image or a specific distortion or intensity attenuation is not achieved, as would be the case perhaps if a glass cover is provided on an optical camera, and the resulting image is clearly different to an image most recently recorded or to a reference image that is permanently provided beforehand. The lack of a cover, damage to a cover or malfunction of a cover can in other words be determined by image evaluation, for example image comparison.

In one embodiment, a further microwave dome or collar is attached to the microwave dome on the outer wall at at least one of the sensor openings, in particular the second sensor opening. As a consequence, the advantage is achieved that the associated sensor opening, in particular second sensor opening, can be located in a region of the (main) microwave dome at which a not insignificant microwave power arrives and then a passage of microwave radiation through the second sensor opening into the appliance interior is particularly reliably blocked.

In one embodiment, the first sensor opening is located in a region of the microwave dome that is furthest from the cooking compartment opening. If the microwave dome is provided in for example a hemisphere shape, the first sensor opening is in particular located centrally in the region of the peak. The second sensor opening (and each further sensor opening) is then arranged eccentrically and near to the cooking compartment opening.

In the simplest embodiment, the above-described sensor arrangement does not comprise any movable parts, in other words also does not comprise any movable covers. Construction and production consequently become particularly simple. Moreover, in this manner during operation over the appliance serviceable life a particularly robust and stable function is achieved.

BRIEF DESCRIPTION OF THE DRAWINGS

The above-described characteristics, features and advantages of this invention and also the manner in which these are achieved become clearer and more explicitly understandable in conjunction with the following schematic description of an exemplary embodiment that is further explained in conjunction with the drawings.

DETAILED DESCRIPTION OF EXEMPLARY EMBODIMENTS OF THE PRESENT INVENTION

Figure 1:
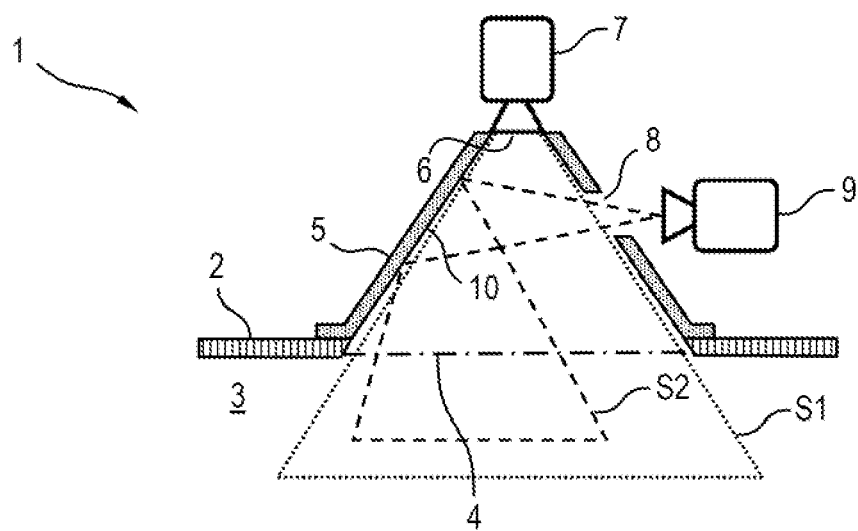
FIG. 1 shows a sectional representation in a side view of a section of a household microwave appliance in accordance with a first exemplary embodiment.

FIG. 1 shows a sectional representation in a side view of a section of a household microwave appliance 1 in the region of a cover 2 of a cooking compartment wall. The cooking compartment wall surrounds a cooking compartment 3. The household microwave appliance 1 has a microwave generator (not illustrated) that is configured so as to generate microwaves. The microwaves are guided into the cooking compartment, for example via a microwave guiding arrangement (not illustrated) in order to influence food (not illustrated) that is located in said cooking compartment.

A wall opening or cooking compartment opening 4 is located in the cover 2 and said wall opening or cooking compartment opening is covered by a microwave dome 5 that is arranged on the cover 2 remote from the cooking compartment. In this case, the microwave dome 5 has in an exemplary manner a truncated cone or truncated pyramid-shaped base shape. A first sensor opening 6 is provided at the point that is furthest away from the cooking compartment opening 4 in the microwave dome 5 and a first sensor in the form of an optical camera 7 is arranged in a stationary manner behind said sensor opening. A second sensor opening 8 is located in a side wall of the microwave dome 5 and a second sensor in the form of an IR camera 9 is arranged in a stationary manner behind said second sensor opening. The optical camera 7 is oriented perpendicularly downward directly into the cooking compartment 3 as is indicated by the field of view S1 of said optical camera. As is indicated by the field of view S2 of the IR camera, the IR camera 9 is oriented indirectly into the cooking compartment 3 via a surface 10 of the microwave dome 5 and said surface reflects IR radiation.

The reflecting surface 10 is located opposite the second sensor opening 8 and is formed by an inner surface of the microwave dome 5. The shape of the reflecting surface 10 can deviate from the truncated cone-shaped or truncated pyramid-shaped base shape of the inner side of the microwave dome 5. The field of view S1 of the optical camera 7 and the field of view S2 of the IR camera 9 at least approximately conform in the cooking compartment 3, in other words said fields of view show at least approximately an identical image section of the cooking compartment 3.

Figure 2:
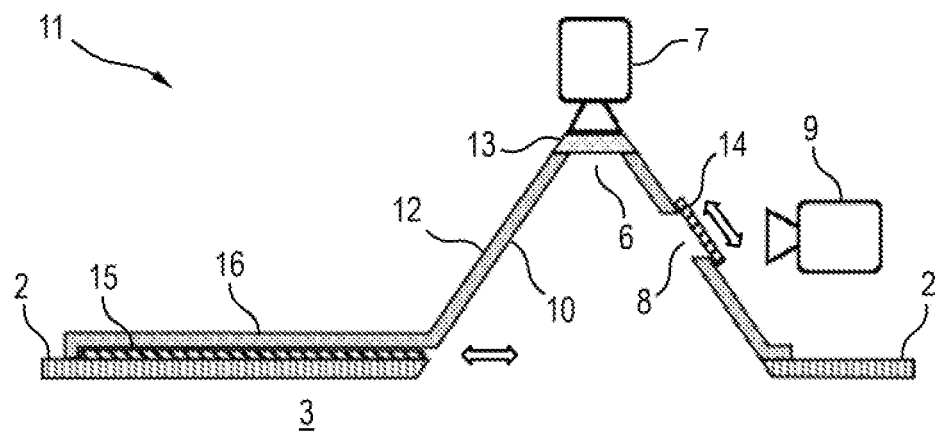
FIG. 2 shows a sectional representation in a side view of a section of a household microwave appliance in accordance with a second exemplary embodiment.

FIG. 2 shows a sectional representation in a side view of a section of a household microwave appliance 11. The household microwave appliance 11 is constructed in a similar manner to the household microwave appliance 1, however it has a microwave dome 12 that is modified in comparison to the microwave dome 5.

The first sensor opening 6 is therefore permanently covered by a cover element in the form of an optically transparent protective disc 13, for example by means of a protective disc 13 of glass that can be IR-mirrored for an additional thermal protection.

As is indicated by the double arrow, the second sensor opening 8 can be selectively covered and revealed by means of a further, cover element ("shutter") 14 that can move in a motorized manner and is made from material that is impermeable to infrared radiation. The shutter 14 can be moved in this case parallel to the second sensor opening 8.

During an operating sequence of the household microwave appliance 1 or 11 in order to treat food, in general optical recordings or images are recorded by the optical camera 7 and IR recordings or images are recorded by the IR camera 9 at specific time intervals, for example every 5 seconds, 10 seconds, 30 seconds, 1 min, or similar. The cameras 7 and 9 are therefore only in operation for a small time proportion of the operating sequence. The shutter 14 therefore also only needs to be removed from the second sensor opening 8 for a short time in order to render it possible to make an infrared recording and said shutter can then be brought back in front of the second sensor opening 8 so as to protect the IR camera 9 with respect to an effect of heat and vapor.

Furthermore, as is indicated by the associated double arrow the cooking compartment opening 4 can be selectively covered and revealed by means of a yet further cover element ("dome cover") 15 that can move in a motorized manner. For this purpose, the dome cover 15 can be pivoted, rotated, displaced in a linear manner, etc.

The dome cover 15 can be provided alternatively or in addition to the cover element 13 and/or to the shutter 14. The dome cover 15 in this case is advantageously optically transparent and impermeable to infrared radiation, for example an IR-mirrored glass disc. It is always only necessary to remove the dome cover 15 from the cooking compartment opening 4 for a short time in order to render it possible to make an IR recording while the optical camera 7 can record images from the cooking compartment 3 through the dome cover 15. The dome cover can then be moved back in front of the cooking compartment opening 4 so as to protect the microwave dome 12, the optical camera 2 and the IR camera 9 with respect to an effect of heat and vapor. Alternatively, the dome cover 15 can also reveal the cooking compartment opening 4 for a recording of the optical camera 7, for example if the dome cover 15 is optically opaque.

The dome cover 15 can be arranged in its position, which reveals the cooking compartment opening 4, in a pocket 16 of the microwave dome 12 or said dome cover can also be arranged outside the microwave dome 12. The region of the dome cover 15 is provided in a manner sealed with respect to microwaves when in particular it can then be implemented in a constructively simple manner if the pocket 16 is provided.

Figure 3:
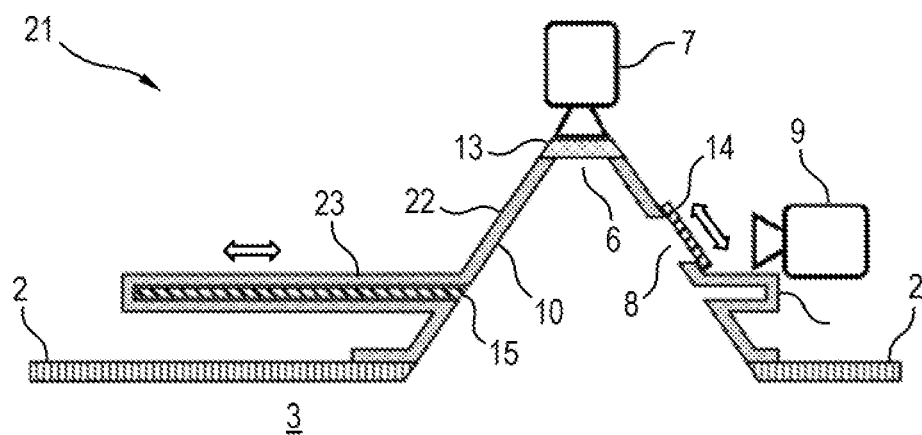
FIG. 3 shows a sectional representation in a side view of a section of a household microwave appliance in accordance with a third exemplary embodiment.

FIG. 3 shows a sectional representation in a side view of a section of a household microwave appliance 21. The household microwave appliance 21 is constructed in a similar manner to the household microwave appliance 11 however has a microwave dome 22 that is modified in comparison to the microwave dome 12. The pocket 23 is located on the microwave dome 22 with the dome cover 15 not directly connected to the cover 2 of the cooking compartment wall but rather on a plane between the cover 2 of the cooking compartment wall and the second sensor opening 8. This leads to a yet more advantageous thermal decoupling of the camera 7 and 9 from the cooking compartment 3.

Figure 4:
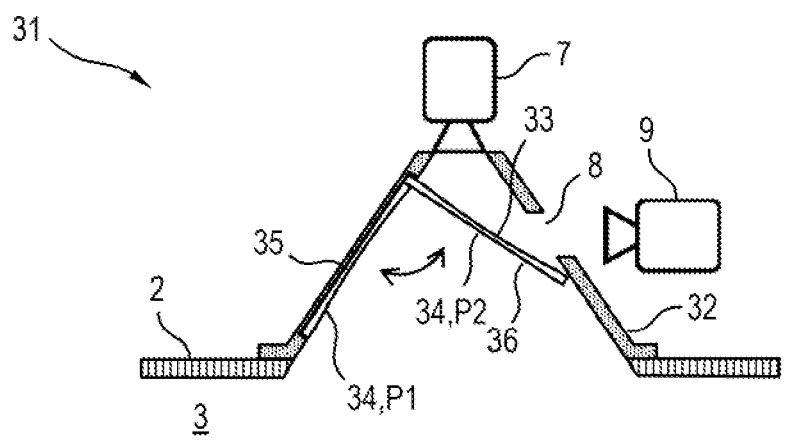
FIG. 4 shows a sectional representation in a side view of a section of a household microwave appliance in accordance with a fourth exemplary embodiment.

FIG. 4 shows a sectional representation in a side view of a section of a household microwave appliance 31. The household microwave appliance 31 is constructed in a similar manner to the household microwave appliance 1 however has a microwave dome 32 that is modified in comparison to the microwave dome 5.

The reflecting surface 33 is now provided on a mirror element 34 that is attached in a pivotable manner to the microwave dome 32 and is arranged on the inner side in the microwave dome 32. The mirror element 34 can assume two end positions of which in a first end position P1 the IR camera 9 is oriented indirectly in the cooking compartment 3 via the reflecting surface 33 of the mirror element 34. In this case, the mirror element 34 is embedded in an inner side receiving arrangement or pocket 35 of the microwave dome 32 and said receiving arrangement or pocket lies opposite the second sensor opening 8. This provides the advantage that the mirror element 34 does not enter or does not substantially enter the field of vision S1 of the optical camera 7.

In its second end position P2, the mirror element 34 is pivoted into the microwave dome 32 with the result that said mirror element protrudes into the interior space of said microwave dome and covers the IR camera 9 and also the optical camera 7 with respect to the cooking compartment 3. In this case, the side 36 of the mirror element 34 that is remote from the reflecting surface 33 is facing the cooking compartment 3 with the result that in the second end position P2, the reflecting surface 33 is also protected with respect to the cooking compartment 3.

Advantageously, the second end position P2 corresponds to the idle position or normal position of the mirror element 34 from which it is only then pivoted in a motorized manner into the end position P1, which is used as the operating position or receiving position, if an image is to be recorded by means of the optical camera 7 and/or the IR camera 9. The optical camera 7 and/or the IR camera 9 in the operating position can simultaneously record an image from the cooking compartment 3.

Figure 5:
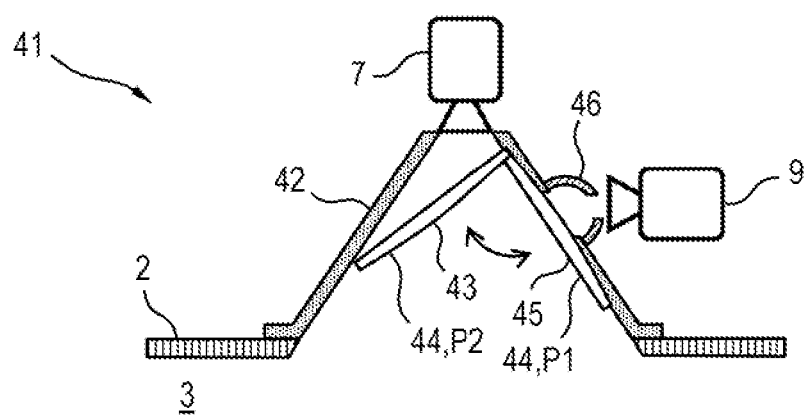
FIG. 5 shows a sectional representation in a side view of a section of a household microwave appliance in accordance with a fifth exemplary embodiment

FIG. 5 shows a sectional representation in a side view of a section of a household microwave appliance 41. The household microwave appliance 41 is constructed in a similar manner to the household microwave appliance 1 however has a microwave dome 42 that is modified in comparison to the microwave dome 5.

The reflecting surface 43 is provided on a mirror element 44 that is attached in a pivotable manner to the microwave dome 42 and is arranged on the inner side in the microwave dome 42.

The mirror element 44 can assume two end positions of which in a first end position P1 the mirror element 44 covers the second sensor opening 8. For this purpose, the mirror element can be embedded in a receiving arrangement or pocket (not illustrated) of the microwave dome 42 and said receiving arrangement or pocket comprises the second sensor opening 8. This provides the advantage that in the first end position P1 the mirror element 44 does not enter or does not substantially enter the field of vision S1 of the optical camera 7.

In the first end position P1, the field of view S1 of the optical camera 7 into the cooking compartment 3 is enabled with the result that the optical camera 7 can record images from the cooking compartment 3, the IR camera conversely cannot. In the first end position P1, the side 45 of the mirror element 44 that is remote from the reflecting surface 43 is facing the cooking compartment 3 with the result that the reflecting surface 43 is also protected with respect to the cooking compartment 3.

In its second end position P2, the mirror element 44 is pivoted into the microwave dome 42 with the result that said mirror element protrudes into the interior space of the microwave dome and covers the optical camera 7 with respect to the cooking compartment 3. The IR camera 9 is then oriented indirectly in the cooking compartment 3 via the reflecting surface 43. In the second end position P2, only the IR camera 9 can record images from the cooking compartment 3.

In particular, in the event that the first sensor opening 6 should be covered by a protective disc 13 (not illustrated), the first end position P1 corresponds to the idle position or normal position of the mirror element 44 from which it is only then pivoted in a motorized manner into the second end position P2, which is referred to as the operating position or receiving position, if an image is to be recorded by means of the IR camera 9.

In the present case, a further microwave dome 46 or a collar is attached to the microwave dome 42 on the outer wall at the second sensor opening 8 and said further microwave dome or collar itself has an opening through which the IR camera 9 can view through the microwave dome 46 into the microwave dome 42. This provides the advantage that the second sensor opening 8 can be located near to the cooking compartment opening 4 so that microwave radiation can pass through said second sensor opening in a not insignificant amount since this microwave radiation is then blocked by the further microwave dome 46.

Obviously, the present invention is not limited to the illustrated exemplary embodiment.

The protective disc 13, the shutter 14 and/or the dome cover 15 can therefore be used in all illustrated exemplary embodiments.

In general, "a", "one" etc. can be understood to mean a singular or plural, in particular in the sense of "at least one" or "one or multiple" etc. as long as this is not explicitly ruled out, for example by the expression "precisely one" etc.

The disclosure of a number can comprise precisely the disclosed number as well as a customary tolerance range as long as this is not explicitly ruled out.

The invention claimed is:

1. A household microwave appliance, comprising:
a cooking compartment;
a cooking compartment wall surrounding the cooking compartment and including a cooking compartment opening;
a microwave dome arranged remote from the cooking compartment and designed to cover the cooking compartment opening, said microwave dome including a first sensor opening and a second sensor opening;
a first sensor arranged behind the first sensor opening and oriented directly into the cooking compartment, the first sensor being an optical camera;
a second sensor, the second sensor being an IR camera, arranged behind the second sensor opening and oriented indirectly into the cooking compartment via a reflecting surface of the microwave dome, the reflecting surface being a surface that reflects infrared radiation; and
a mirror element defining the reflecting surface and attached to the microwave dome in a pivotable manner, said mirror element being pivotable to a first end position in which the optical camera is oriented directly in the cooking compartment and the IR camera is oriented indirectly in the cooking compartment via the reflecting surface of the mirror element, and to a second end position in which the mirror element covers at least the IR camera with respect to the cooking compartment.

2. The household microwave appliance of claim 1, wherein the reflecting surface is attached to a wall of the microwave dome.

3. The household microwave appliance of claim 1, further comprising a mirror element defining the reflecting surface and attached to the microwave dome in a pivotable manner, said mirror element being pivotable to a first end position in which the mirror element covers the IR camera with respect to a space of the microwave dome, and to a second end position in which the IR camera is oriented indirectly in the cooking compartment via the reflecting surface of the mirror element.

4. The household microwave appliance of claim 1, further comprising a cover element of optically transparent material, said cover element permanently covering the first sensor opening.

5. The household microwave appliance of claim 1, further comprising a movable shutter of a material that is impermeable to infrared radiation, said shutter configured to selectively cover and reveal the second sensor opening.

6. The household microwave appliance of claim 1, further comprising a movable dome cover element configured to selectively cover and reveal the cooking compartment opening with respect to the microwave dome.

7. The household microwave appliance of claim 6, wherein the dome cover element is optically transparent and impermeable to infrared radiation.

8. The household microwave appliance of claim 1, wherein the first sensor and the second sensor have fields of view which at least approximately conform in the cooking compartment.

9. The household microwave appliance of claim 1, further comprising a further dome or a collar attached to an outer wall of the microwave dome at the second sensor opening.

10. The household microwave appliance of claim 1, wherein the first sensor opening is located in a region of the microwave dome which region is furthest from the cooking compartment opening.

* * * * *